Patented Mar. 16, 1954

2,672,480

UNITED STATES PATENT OFFICE 2,672,480

PREPARATION OF β-ALANINE

Albert S. Matlack, Wilmington, Del., assignor to Hercules Powder Company, Wilmington, Del., a corporation of Delaware No Drawing. Application July 5, 1952,
Serial No. 297,385

3 Claims. (Cl. 260—534)

This invention relates to a new process of synthesizing β-alanine and, more particularly, to a process for preparing β-alanine from acrylamide.

β-Alanine is an important amino acid and many attempts have been made to discover some means by which it could be synthesized by a low-cost commercial process, but to date all of the processes for preparing β-alanine are costly either because of the expensive reagents utilized in its synthesis or because of the low yields which are obtained. Consequently, the price of β-alanine has remained at a high level and is, in fact, prohibitive for the use of this amino acid in many applications.

Now, in accordance with this invention, a method has been discovered whereby β-alanine may be produced in high overall yields from a relatively inexpensive starting material, acrylamide, by a simply and easily operated process. The process of this invention is carried out by contacting acrylamide with a strongly basic catalyst to produce a polymeric intermediate material which is hydrolyzed by heating it with an aqueous solution of an acid or base. The reactions involved in this synthesis are believed to be as follows:

etc.; the alkali metal salts of triphenylmethane such as triphenylmethyl sodium, etc.; and the alkali metals themselves such as sodium, potassium, etc. Thus, the strongly basic catalyst may be defined as one having a basic strength that is at least as strong as that of potassium hydroxide. The basic compound acts as a true catalyst for this polymerization reaction and hence any amount of it may be used from a catalytic amount up to a large excess, if desired. In general, an amount of from about 0.03% to about 1% based on the weight of the monomer is used.

The polymerization may be carried out either in the presence or absence of an inert liquid diluent. In either case, it should be carried out in a nonaqueous medium, i. e., under substantially anhydrous conditions to avoid decomposition of the basic catalyst and addition of water to the double bond of the acrylamide. Bulk polymerization is generally preferred inasmuch as it is then not necessary to remove the inert liquid diluent either before or after the hydrolysis step which follows. However, it is possible to carry out the polymerization stage by a solution process using a liquid which is inert under the reaction conditions as diluent. For example, the process may be carried out in the presence of

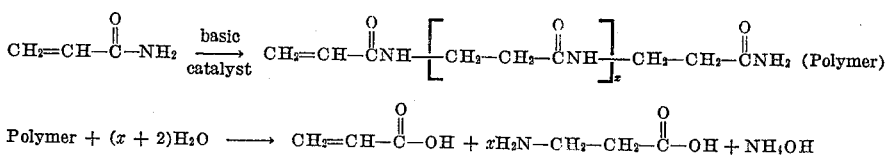

One of the advantages of this process is that the hydrolysis step may be carried out directly after the polymer formation without the necessity of isolating or fractionating the intermediate polymer.

The acrylamide is polymerized by contacting it with a strongly basic catalyst under substantially anhydrous conditions. Any strongly basic catalyst may be used to catalyze the polymerization. Exemplary of the catalysts that may be used are the strongly basic hydroxides, as, for example, the alkali metal hydroxides such as sodium and potassium hydroxide, and quaternary ammonium hydroxides such as benzyltrimethylammonium hydroxide; the alkali metal alkoxides such as sodium methoxide, sodium ethoxide, sodium tert-butoxide, etc., and the corresponding potassium alkoxides; the alkali metal amides such as sodamide, potassium amide, etc.; alkali metal hydrides such as sodium hydride, inert organic diluents such as the hydrocarbon solvents, as, for example, hexane, heptane, octane, benzene, toluene, etc.; the tertiary alcohols such as tert-butanol, tert-amyl alcohol, etc.; ethers such as dioxane, dibutyl ether, diphenyl ether, etc.; basic solvents such as pyridine, quinoline, etc. It may also be carried out in such a diluent as liquid ammonia. Any desired amount of solvent may be used, but generally is such an amount as to provide solutions containing from about 2% to about 50% of acrylamide, and preferably from about 10% to 20% of acrylamide.

The temperature at which the polymerization step is carried out may be varied over a wide range, depending on the activity of the catalyst, whether a solvent is used, etc. For example, if carried out in bulk or in an inert organic diluent, a temperature of from about 25° to about 200° C. may be used, and preferably a temperature of from about 80° to about 110° C. may be used. If the polymerization is carried out in liquid ammonia, temperatures as low as —40° C. may be used with a catalyst such as sodamide.

Since acrylamide readily undergoes a radical-induced polymerization, it is usually preferable to add an inhibitor for this type of polymerization. Any of the compounds which are well-known to inhibit radical-induced polymerization may be used, as, for example, hydroquinone, quinone, phenyl β-naphthylamine, etc., but preferably the inhibitor is a nonhydroxylic inhibitor since a higher molecular weight intermediate is obtained when this type of inhibitor is used. The amount of such an inhibitor which is added may, of course, vary over a wide range, but generally is within the range of from about 0.005% to about 0.1% based on the weight of acrylamide.

The amount of time required for this first stage in the process of this invention will depend upon the temperature, catalyst, and whether or not an inert diluent is used. For example, if the polymerization is carried out by a bulk process, a high molecular weight intermediate is obtained within a few minutes, but a longer time may be required if the polymerization is carried out by a solution process. The extent to which the polymerization reaction is carried out is not critical insofar as the overall process is concerned. However, for higher yields of β-alanine and reduction in the contamination which is introduced by the presence of the vinyl end group in the polymer, it is preferable that the intermediate have attained a degree of polymerization of at least 10. Usually the base-catalyzed polymerization is allowed to proceed to as high a degree of polymerization as will be produced in a reasonable length of time.

As pointed out above, the hydrolysis of the intermediate polymer may usually be carried out directly on the reaction mixture. Such is the case when the polymerization is carried out in bulk or in an inert organic diluent unless the organic diluent is water-miscible, in which case it would be preferable, for the sake of economical operation, to remove the solvent by filtration, distillation, or other means before the hydrolysis step. However, when liquid ammonia, or any other solvent which reacts with the hydrolytic agent which is used in the next step, is used as the diluent, it is, of course, necessary to remove the solvent before proceeding with the hydrolysis step.

The hydrolysis of this intermediate polymeric material is readily carried out by adding water and an acid or base and then heating the reaction mixture until the hydrolysis is complete. Any strong mineral acid may be used to catalyze this hydrolysis reaction; as, for example, a mineral acid such as hydrochloric acid, sulfuric acid, phosphoric acid, hydrobromic acid, hydriodic acid, or an organic acid such as trichloroacetic acid may be used. The concentration of the aqueous acid solution which is added is not critical, but generally a concentration of from about 20% to about 50% is used. The hydrolysis may also be carried out with a base, as, for example, an alkali metal hydroxide such as sodium or potassium hydroxide, an alkaline earth metal hydroxide such as barium or calcium hydroxide, etc. The temperature at which this hydrolysis step is carried out may be varied over a wide range, the lower limit being that at which the hydrolysis proceeds at a reasonable rate and the upper limit by the stability of β-alanine or its salts in the hydrolysis medium. For example, if a base, such as barium hydroxide, is used to carry out the hydrolysis, higher temperatures and longer reaction times are required than those which are necessary when an acid is used as the hydrolytic agent. Under such circumstances it may be desirable to operate the reaction under pressure and at temperatures up to about 200° C. to bring about the hydrolysis in a reasonable length of time. Thus, the hydrolysis step may be carried out at temperatures of from about 50° C. to about 200° C., and preferably is carried out at temperatures of from about 80° C. to about 160° C. The time required for the hydrolysis step will vary with the strength of the acid or base being used as the hydrolytic agent, the temperature, etc. Usually it is sufficient to heat the polymer with the hydrolytic agent at a reflux temperature for a short length of time.

The method by which the β-alanine is separated and purified will depend upon the process used for its preparation. If an acid is used to catalyze the hydrolysis reaction, it may be removed from the hydrolyzate by any of the usual means, as, for example, it may be neutralized with a compound which will form an insoluble salt with the acid anion, as, for example, barium hydroxide, barium carbonate, calcium hydroxide, calcium carbonate, etc. The acid may also be removed by means of an anion exchange resin or by any other desired means. Thus, if sulfuric acid is used, then any neutralizing agent which forms a water-insoluble substance with sulfuric acid may be used to remove the excess acid. If a carbonate is used for this purpose, the β-alanine will be isolated as its sulfate which must then be treated with an alkaline earth hydroxide to liberate the amino acid. If hydrochloric acid is used as the hydrolytic agent, the β-alanine may be recovered from its hydrochloride with triethylamine or any of the other usual means. If a basic hydrolysis is carried out, the β-alanine will be recovered as its metal salt and an acid will be required to liberate the free β-alanine. In the case of the use of barium or calcium hydroxide, carbon dioxide may be used to obtain the free β-alanine. The β-alanine may be further purified by recrystallization from any suitable solvent, as, for example, aqueous methanol, etc.

The following example will illustrate the process of this invention.

*Example*

To a mixture of 10 parts of acrylamide and 0.05 part of phenyl β-naphthylamine was added a solution of 0.4 part of sodium in 15 parts of tert-butanol. The tert-butanol was removed in vacuo at 40° C. and the reaction mixture was then heated to form a homogeneous melt. A vigorous exothermic reaction set in and the reaction was complete within 2 to 3 minutes. An excess (40 parts) of 50% aqueous sulfuric acid was added and the reaction mixture was heated under reflux for 4 hours. It was then neutralized to a pH of 7 with hot aqueous barium hydroxide. The barium sulfate was removed by filtration and the precipitate was washed twice with water. The combined filtrates were evaporated to dryness in vacuo whereby a sirup was obtained which crystallized on cooling. This crystalline material amounted to a yield of 90% of β-alanine based on acrylamide used. On recrystallization from hot methanol, it was found to have a melting point of 195°–196° C., and a mixed melting point of it with a known sample of β-alanine was not depressed.

What I claim and desire to protect by Letters Patent is:

1. The process of preparing β-alanine which comprises contacting acrylamide with a strongly basic catalyst, adding an aqueous solution of a hydrolytic agent to the polymeric material so obtained, and heating until said polymeric material is hydrolyzed.

2. The process of preparing β-alanine which comprises contacting acrylamide with a strongly basic catalyst at a temperature of from about 25° C. to about 200° C., adding to the polymer so obtained an aqueous solution of an acid, and heating the reaction mixture to a temperature of from about 50° C. to about 200° C. until the polymer is hydrolyzed.

3. The process of preparing β-alanine which comprises contacting acrylamide with a strongly basic catalyst at a temperature of from about 80° C. to about 110° C., adding to the polymer so obtained an aqueous solution of an acid, and heating the reaction mixture to a temperature of from about 80° C. to about 160° C. until the polymer is hydrolyzed.

ALBERT S. MATLACK.

References Cited in the file of this patent

UNITED STATES PATENTS

| Number | Name | Date |
|---|---|---|
| 2,453,234 | Koch | Nov. 9, 1948 |
| 2,461,842 | Olin | Feb. 15, 1949 |
| 2,498,300 | Scott et al. | Feb. 21, 1950 |

FOREIGN PATENTS

| Number | Country | Date |
|---|---|---|
| 62,989 | Denmark | Dec. 11, 1944 |